United States Patent [19]

Ishibashi et al.

[11] 4,349,813
[45] Sep. 14, 1982

[54] BLOWN FUSE SENSOR

[75] Inventors: Naoto Ishibashi; Ryosuke Taniguti; Junichi Miyaji; Yosaburo Ichinose, all of Nagasaki, Japan

[73] Assignee: Mitsubishi Denki Kabushiki Kaisha, Tokyo, Japan

[21] Appl. No.: 112,142

[22] Filed: Jan. 14, 1980

[30] Foreign Application Priority Data

Aug. 17, 1977 [JP] Japan .................................. 52/98902

[51] Int. Cl.³ ...................... G08B 21/00; H02H 7/125
[52] U.S. Cl. ................................. 340/638; 310/68 R; 340/639; 340/645; 363/53
[58] Field of Search ............... 340/645, 638, 639, 648, 340/635; 361/104; 310/68 R, 68 D; 363/50, 52, 53

[56] References Cited

U.S. PATENT DOCUMENTS

| 3,030,531 | 4/1962 | Lessmann | 310/68 R |
| 3,200,392 | 8/1965 | Chumakov | 340/645 X |
| 3,205,423 | 9/1965 | Kanngiesser | 363/53 |
| 3,462,754 | 8/1969 | Kelley | 340/645 |
| 3,512,073 | 5/1970 | South | 340/638 X |
| 3,670,231 | 6/1972 | Maddick | 340/639 X |
| 3,866,196 | 2/1975 | Mann et al. | 340/639 |
| 4,074,346 | 2/1978 | Riley | 363/50 |

FOREIGN PATENT DOCUMENTS

| 45-23449 | 8/1970 | Japan . | |
| 51-30928 | 3/1976 | Japan . | |
| 704746 | 3/1954 | United Kingdom | 340/645 |

Primary Examiner—Thomas A. Robinson
Assistant Examiner—Daniel Myer
Attorney, Agent, or Firm—Wenderoth, Lind & Ponack

[57] ABSTRACT

Each arm forming a three-phase full wave rectifier bridge includes a semiconductor diode, a current transformer and a fuse. The current transformer is connected to a pulse extinction indicator circuit through a pulse transformer. When no current flows through the arm for a predetermined time or more, the pulse extinction detection circuit produces a DC signal indicating the blowing of the fuse. The rectifier bridge, the current transformers, the fuses and the pulse extinction detection circuit are all disposed on the rotor of a brushless synchronous machine.

2 Claims, 7 Drawing Figures

BLOWN FUSE SENSOR

BACKGROUND OF THE INVENTION

This invention relates to a device for sensing the blowing of a fuse connected in series with a rectifier element forming a rectifier device, and more particularly to a blown fuse sensor device for use with a rotary rectifier to sense externally and automatically the blowing of a fuse due to a shortcircuit of the rectifier element involved.

Brushless synchronous machines, for example, brushless AC generators, are provided with a rotary rectifier for rectifying the output from an AC exciter employed and for energizing the field of an associated main generator. The rotary rectifier normally has a three-phase bridge configuration and includes a protective fuse serially connected with each of at least two rectifier elements disposed on each rectifier arm of the bridge. When a shortcircuit occurs in any one of the rectifier elements, the associated fuse is blown thereby protecting the remaining sound rectifier elements from any overcurrent.

In order to sense the blowing of the protective fuse in the conventional type of rotary rectifiers such as described above, it is already known to monitor the behavior of the fuse by means of a stroboscope either by causing a visible change such as the firing of an indication lamp due to the blowing of the fuse or by imparting a mechanical indication function to the fuse itself. Such measures are premised on the monitoring of rotary rectifiers through visual observation and the reliability thereof depends on whether or not it is certain that, upon the occurrence of a fault on any rectifier element, the behavior indicator can be visually monitored. This requires a great deal of labor.

It is also previously known to employ special fuses having a contact mechanism attached thereto in order to sense the blowing of the fuses. This measure causes the possible fear that a malfunction may be caused by the bad engagement of the contacts involved and is disadvantageous in that, with such a fuse required to be disposed on the rotor of a brushless synchronous machine, there are fears that the rotor may be rotated in an unbalanced state because the fuse has a mechanically moving member, the design and construction of rotary rectifiers lacks versatility and so on.

Accordingly, it is an object of the present invention to provide a new and improved blown fuse sensor device for surely sensing the blowing of a fuse without the necessity of using mechanical contacts or the like.

It is another object of the present invention to provide a new and improved blown fuse sensor device formed of a contactless circuit to prevent malfunction caused from the bad engagement of contacts and not including any mechanically moving member.

It is still another object of the present invention to provide a new and improved blown fuse sensor device capable of being installed on the rotor of a brushless synchronous machine to prevent the rotor from rotating in an unbalanced state and also to alleviate structural limitations.

SUMMARY OF THE INVENTION

The present invention provides a blown fuse sensor device comprising a series circuit including a fuse, a current detector means connected in the series circuit to detect the current flowing through the series circuit, a converter means responsive to an output from the current detector means to produce a pulse signal, and a signal generator means for generating a signal indicating the blowing of the fuse when a pulse signal from the converter means is not applied thereto for at least a predetermined time interval.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
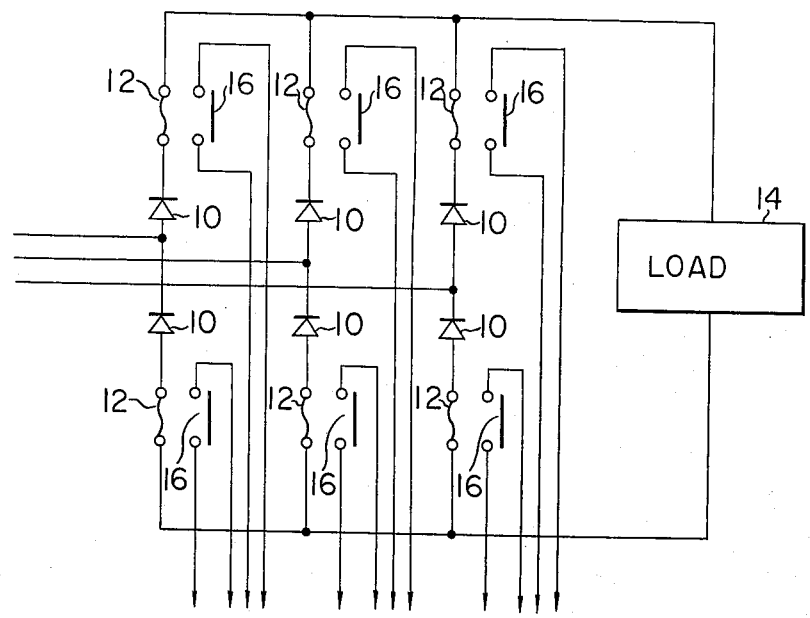
FIG. 1 is a circuit diagram of a conventional blown fuse sensor device.

Referring now to FIG. 1 of the drawings, there is illustrated a conventional blown fuse sensor device for use with a rectifier device. The arrangement illustrated comprises a three-phase full-wave rectifier circuit arranged in a three-phase bridge configuration including a plurality of branches or arms each formed of a series circuit of a rectifier element 10 such as a semiconductor diode and a fuse 12. A set of contacts 16 is operatively coupled to each of the fuses 12 to be closed in response to the blowing of the associated fuse 12 to thereby produce an electrical signal. The rectifier circuit is connected to a three-phase load 14.

In operation three-phase AC power from a three-phase electric source (not shown) is rectified by the respective rectifier elements 10 and is then supplied, as DC power, to the load 14 through the associated fuses 12. It is assumed that a fault such as a shortcircuit occurs in any of the rectifier elements 10 causing an excessive current to flow through that series circuit including the failed rectifier element 10. Under the assumed conditions, that fuse 12 connected to the failed rectifier element 10 is fused or blown to prevent the continuation of an abnormal state due to excessive current. At the same time, that contact set 16 operatively coupled to the blown fuse 12 is closed to produce an electrical signal. This signal is applied to a suitable processing circuit (not shown) and is used as an alarm indicating the blowing of a fuse or a command for suspension of the operation.

In the arrangement of FIG. 1, however, it is necessary to employ special fuses having the contact mechanism annexed thereto and, in addition, there has been a fear that a malfunction may occur due to the bad engagement of the contacts because the contact sets are used as signal sources. Furthermore, when the arrangement of FIG. 1 is required to be disposed on the rotor of a brushless synchronous machine, it is disadvantageous in that, an unbalance may take place in the rotational movement of the rotor because the rotor is mechanically moved, and the design and construction of the rectifier device lacks the versatility and so on.

The present invention contemplates elimination of the disadvantages of the prior art practice as described above by providing a blown fuse sensor device for surely sensing the blowing of a fuse without the necessity of employing mechanical contacts or the like.

Figure 2:
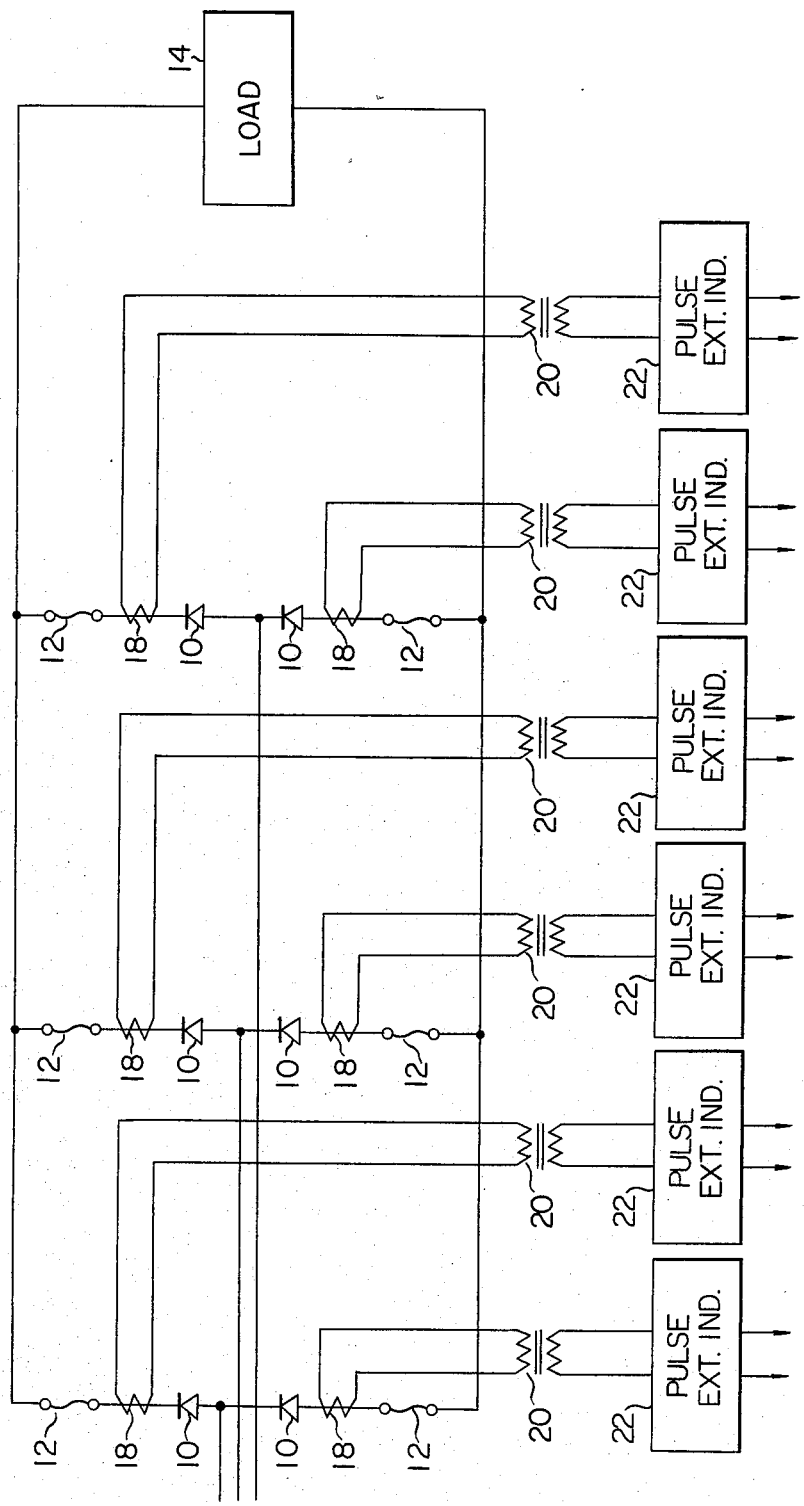
FIG. 2 is a circuit diagram of one embodiment of the blown fuse sensor device of the present invention.

In FIG. 2, wherein like reference numerals designate components identical to those shown in FIG. 1, there is illustrated one embodiment of the blown fuse sensor device of the present invention. The arrangement illustrated is different from that shown in FIG. 1 only in that in FIG. 2, a current transformer 18 is connected in each series circuit consisting of the rectifier element 10 and the fuse 12 having its primary winding formed by the lead interconnecting the rectifier element 10 and the fuse 12. The current transformers 18 each includes a secondary winding connecting across the primary winding of an electrically insulating transformer in the form of a pulse transformer 20 that includes a secondary winding connected to a pulse extinction detection circuit 22.

Figure 3:
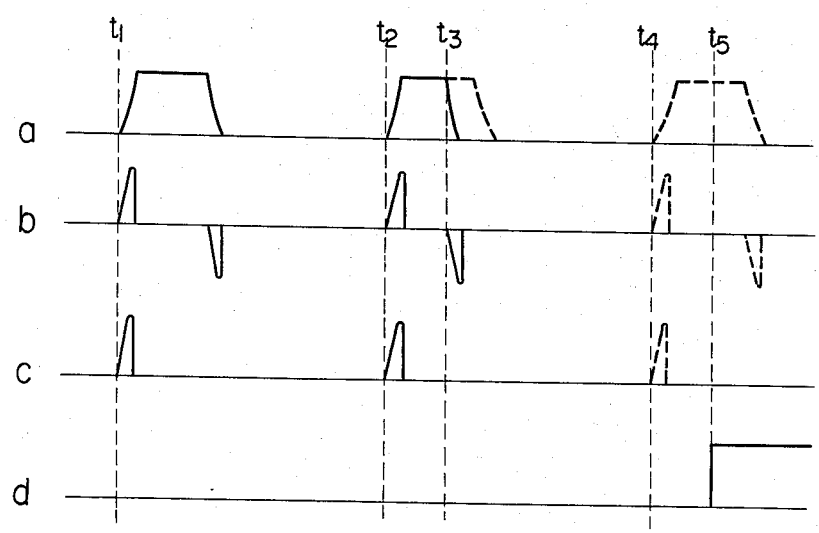
FIG. 3 is a graph illustrating waveforms developed at various points in the arrangement shown in FIG. 2.

The operation of the arrangement shown in FIG. 2 will now be described with reference to FIG. 3 which illustrates waveforms developed at various points in the arrangement of FIG. 2. With the arrangements operated in the normal mode, each of the rectifier elements 10 has flowing therethrough a current having a current waveform as shown in FIG. 3. This current simultaneously forms the primary current flowing through the current transformer 18 to induce a voltage across the secondary winding of the current transformer 18. The primary current flowing through the current transformer 18 is a unidirectional pulsating current as shown by the waveform as in FIG. 3. More specifically, the current begins to flow through the current transformer 18 at time points $t_1$, $t_2$ or $t_4$ and rises to a saturated magnitude after which it falls to a null magnitude. Therefore, the secondary winding of the current transformer 18 can induce voltage pulses in response to the rise and fall of the pulsating current alone as shown by the waveform b in FIG. 3. The voltage pulses thus induced are applied via the pulse transformer 20 to the pulse extinction detection circuit 22 where the voltage pulses are rectified to be converted to the voltage pulses as shown by the waveform c in FIG. 3. From FIG. 3 it is seen that the voltage pulse appearing in the pulse extinction detection circuit 22 results from the rise of the pulsating current flowing through the primary winding of the current transformer 18.

The pulse extinction detection circuit 22 is designed and constructed so that it does not operate when pulse voltages are applied thereto at predetermined time intervals or less but produces a DC signal only when voltage pulses from the pulse transformer 20 are not applied thereto for a predetermined time interval or more. In the example illustrated, the pulse extinction detection circuit 22 produces the DC signal as shown by the waveform d in FIG. 3 only when those voltage pulses are not applied thereto for the predetermined time interval between time points $t_2$ and $t_5$ or longer. This predetermined time interval is longer than the time interval between the rise of each pulsating current portion and that of the next succeeding one or between time points $t_1$ and $t_2$ or $t_2$ and $t_4$.

From the foregoing it is seen that the pulse extinction indicator circuit produces no output signal so long as the arrangement of FIG. 2 is operated in the normal mode.

It is now assumed that any one of the fuses 12 shown in FIG. 2 is blown at the time point $t_3$ after time point $t_2$ (see FIG. 3, waveform a). Under the assumed conditions, no current flows through the primary winding of that current transformer 18 operatively coupled to the blown fuse 12 at and after the time point $t_3$. Therefore no voltage is induced across the secondary winding of that current transformer 18. This means that at time point $t_4$ the pulse extinction detection circuit does not have applied thereto the voltage pulse that is to be normally applied thereto at that time point before time point $t_5$ is reached. That is, the predetermined time interval of the circuit 22 expires. Thus the pulse extinction detection circuit 22 produces a DC output signal at time point $t_5$ as shown by the waveform d in FIG. 3.

The signal from the circuit 22 indicates that the associated fuse 12 has been fused or blown. In other words the blowing of any fuse can be indicated by a DC output signal from the associated pulse extinction detection circuit 22.

There are a variety of known types of pulse extinction detection circuits 22 as described above. For example, reference may be made to "'76 Mitsubishi Semiconductor Handbook-Integrated Circuits", page 737 published on Apr. 15, 1975 by Seibundo-Shin-kosha. In the pulse extinction detector shown in FIG. 7, when an input of a pulse train from a trigger terminal is inputted, as a trigger pulse, to the circuit, a change in pulse frequency and a pulse extinction can be detected. In this case, however, it is required to set a delay time somewhat longer than the repetition time of the input of the pulse train. The entry of one trigger pulse causes an electric charge on a timing capacitor $C_A$ to discharge and a FLIP-FLOP to be set resulting in an output "H".

Accordingly when the input pulses are maintained at the normal pulse spacing, the next trigger pulse enters the connection before a voltage across the timing capacitor $C_A$ reaches a threshold voltage. The timing capacitor $C_A$ again discharges to maintain the output "H".

Figure 7:
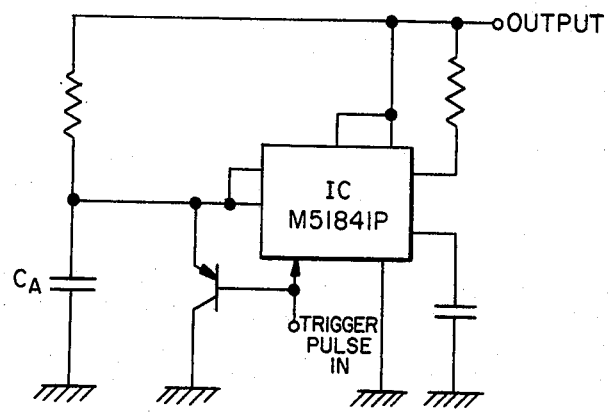
FIG. 7 is a circuit diagram of a pulse extinction detection circuit.

However, upon the occurrence of an abnormality in the input pulses, i.e., upon the extinction of the pulse input, the voltage on the timing capacitor $C_A$ reaches the threshold voltage so as to reset the FLIP-FLOP resulting in the output changing to "L". Integrated circuit M51841P Shown in FIG. 7 is available commercially from Mitsubishi Electric Co., Tokyo, Japan.

Figure 5:
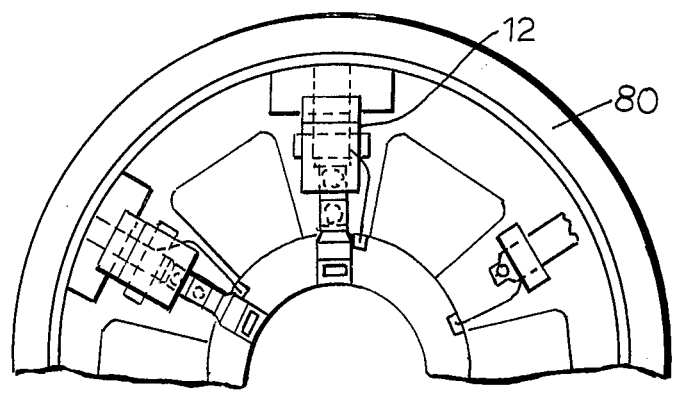
FIG. 5 is a front view of the arrangement shown in FIG. 4 as viewed along the line V—V of FIG. 4 in the direction of the arrow.
Figure 6:
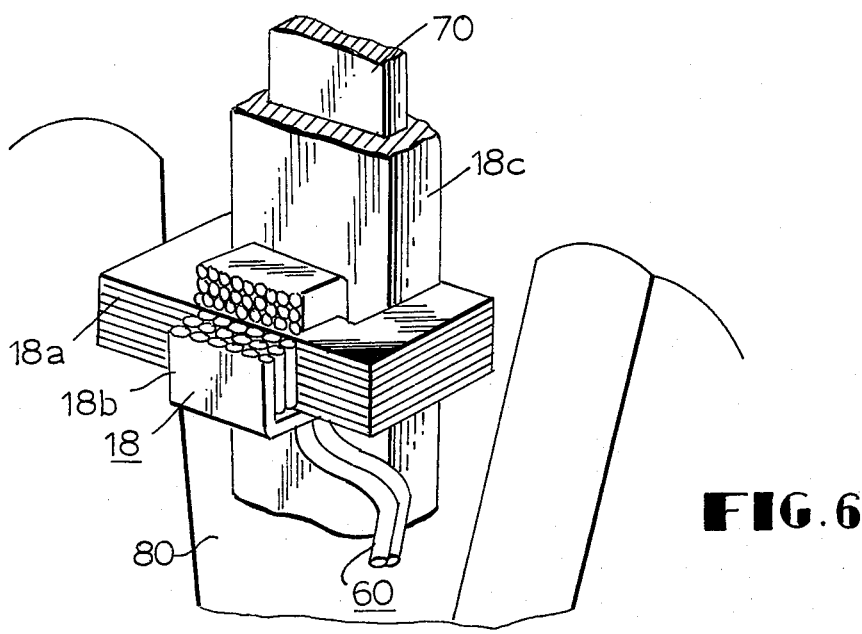
FIG. 6 is an enlarged perspective view of the current transformer shown in FIG. 4 with parts cut away.
Figure 4:
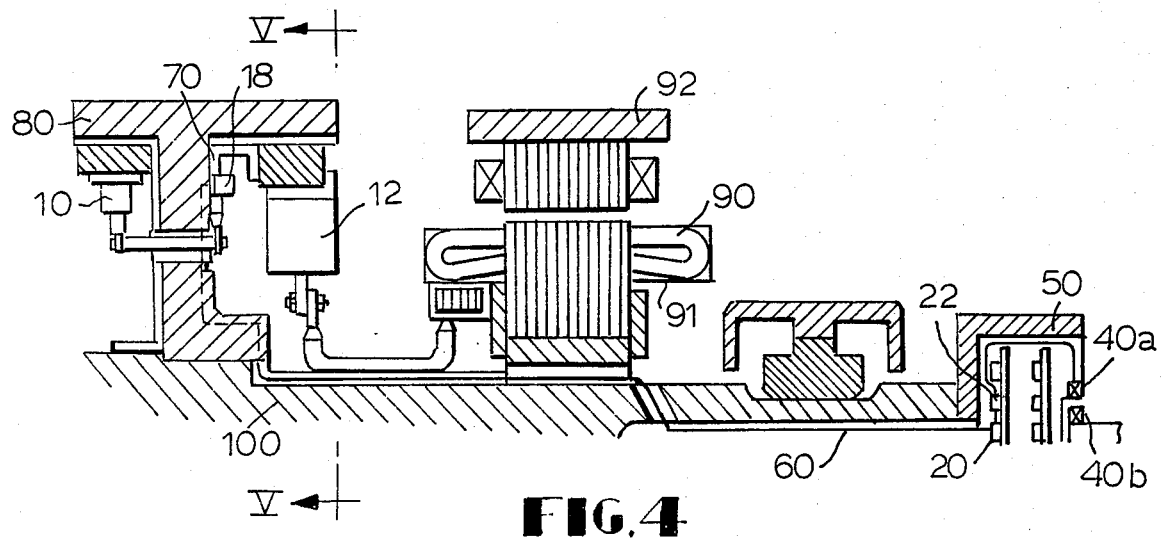
FIG. 4 is a longitudinal sectional view of one embodiment of the blown sensor device of the present invention with the lower half omitted.

The present invention will be further described in conjunction with FIGS. 4, 5, and 6.

In FIG. 4 the rotary shaft 100 of a brushless AC generator includes an AC exciter having its rotor 91 disposed thereon and its stator 92 disposed on a stationary portion opposite the rotor 91. The AC exciter forms a source of three-phase alternating current designated by the three lines connected to the diodes 10 in FIG. 2. A diode wheel 80 is disposed on the rotary shaft 100 located to the left of the exciter 90 and includes a plurality of series combinations of a rectifier element 10 and a fuse 12 disposed at equal angular intervals thereon as shown in FIG. 5. Outputs of the rectifier elements are connected to a rotor winding of an AC generator (not shown) disposed on the rotary shaft 100. The rotor winding is shown in FIG. 2 as comprising the load 14.

As shown in FIG. 4 a conductor 70 connects each of the rectifier elements 10 to its associated fuse 12 and also serves as the primary winding of the current transformer 18 also disposed on the diode wheel 80.

As best shown in FIG. 6 the conductor 70 is sandwiched between two legs of a U-shaped magnetic core 18a of the current transformer 18 through an electrically insulating sleeve 18c. The core 18a is composed of a stack of magnetic laminations and has a secondary winding 18b wound therearound. The output from the secondary winding 18b is supplied to the transformer 20 through a pair of leads 60 running along the rotary shaft 100. The pulse transformer 20 for each current transformer 18 and the pulse extinction detection circuit 22 connected thereto are disposed on a telemetry wheel 50 that is, in turn, disposed on the rotary shaft 100 on that side of the excitor 90 remote from the diode wheel 80. Outputs from all the pulse extinction circuits 22 are applied to an antenna 40a disposed on the telemetry wheel 50. The signal from the antenna 40a is received by an antenna 40b disposed on the stationary portion. This telemetry circuit may be as disclosed in U.S. application Ser. No. 936,504, filed Aug. 24, 1978. Because this telemetry circuit forms no part of the present invention, further description thereof is omitted for brevity. Note that the components as described above are disposed on the rotary shaft 100 to ensure dynamic balance.

In summary, the present invention is so constructed that a current transformer is connected in each series circuit including a rectifier element and a fuse to thereby sense the blowing of the fuse. Further the present invention is formed of a contactless circuit without the necessity of using a special fuse including a contact set and accordingly malfunctions due to the bad engagement of contacts which might have occurred previously do not occur. Also, because the present invention does not include any mechanically moving part, limitations as to the construction can be alleviated.

While the present invention has been illustrated and described in conjunction with a single preferred embodiment thereof it is to be understood that numerous changes and modifications may be resorted to without departing from the spirit and scope of the present invention.

What is claimed is:

1. A rotary electric machine comprising: a rotor; an AC source disposed on said rotor; a DC load disposed on said rotor; and a rotating rectifier device disposed on said rotor connecting said AC source to said DC load and including a series connection rectifier and a fuse; and a blown fuse sensor device disposed on said rotor for sensing occurrence of a failure of said rotating rectifier device, said blown fuse sensor device having a current transformer with a primary winding connected in series with said series connection, a secondary winding magnetically coupled to said primary winding for generating a pulse signal in response to a pulsating current flowing through said series connection, circuit means electrically coupled to said secondary winding for producing a signal indicative of the occurrence of a blowing of a fuse in response to an absence of said pulse signal for a predetermined period of time, an electrically insulating transformer connected between said secondary winding and said circuit means.

2. A rotary electric machine as claimed in claim 1, wherein said electric rotary machine is a brushless synchronous rotary machine.

* * * * *